United States Patent [19]

Purvis

[11] Patent Number: 4,612,955
[45] Date of Patent: Sep. 23, 1986

[54] EDGE WEAR TAB FOR A HIGH TEMPERATURE VALVE COMPONENT

[76] Inventor: Howard A. Purvis, P.O. Box 79286, Houston, Tex. 77279

[21] Appl. No.: 676,498

[22] Filed: Nov. 29, 1984

[51] Int. Cl.<sup>4</sup> .......................... F16K 3/30; F16K 51/00
[52] U.S. Cl. .................................... 137/375; 251/326
[58] Field of Search ............... 251/326, 327, 328, 329, 251/330, 332, 366, 118, 123, 367; 137/375, 329, 329.01, 329.02, 329.03, 329.04, 329.05; 422/232, 219, 310, 145; 138/36, 44; 222/600, 591

[56] References Cited

U.S. PATENT DOCUMENTS

| | | | |
|---|---|---|---|
| 2,787,438 | 4/1957 | Bauer | 137/375 X |
| 3,142,960 | 8/1964 | Bluck | 138/44 |
| 3,279,002 | 11/1966 | Meves et al. | 251/326 X |
| 3,726,306 | 4/1973 | Purvis | 251/329 X |
| 4,079,747 | 3/1978 | Roberts | 137/375 |
| 4,311,166 | 1/1982 | DeFeo | 137/375 |
| 4,338,963 | 7/1982 | Frame | 137/375 |
| 4,346,730 | 8/1982 | Gardner | 137/375 |

Primary Examiner—Martin P. Schwadron
Assistant Examiner—J. Starsiak
Attorney, Agent, or Firm—Glaser, Griggs & Schwartz

[57] ABSTRACT

An edge wear tab for high temperature valve components, such valve components having an upstream face and a downstream face. The edge wear tab of the present invention has an increased mounting area for enhanced ease in mounting the tab body with the valve and for increased anchoring of refractory or composite material with the valve-component. Further, the edge wear tab of the present invention enhances valve component strength by increasing localized compressive forces in such refractory or composite materials in the area adjacent to such tab body.

8 Claims, 5 Drawing Figures

EDGE WEAR TAB FOR A HIGH TEMPERATURE VALVE COMPONENT

FIELD OF THE INVENTION

The field of this invention relates to high temperature valves suitable for gaseous flow streams and particularly to devices to inhibit wear in same.

BACKGROUND OF THE INVENTION

Processing steps in refineries or other manufacturing plants frequently require or generate high temperatures. Typically, a process such as a fluid catalytic cracking step requires valves capable of efficient and reliable operation in hostile environments. These valves must resist the erosive forces of high temperature gases and/or solids entrained therein. These gases can have a temperature of 1800° and even higher in some instances. The impact of fluid entrained particles flowing at high velocities tends to erode valve components projecting into the fluid stream.

The valves most commonly used in high temperature gas applications are slide valves and plug valves. These valves feature single or multiple slides or plugs operating in a plane generally perpendicular or parallel to the direction of fluid flow in the valve, thereby controlling flow, as needed. These valves also employ an orifice section which may be located upstream or downstream of the slide or plug depending upon the design employed. The orifice edges as well as the edges of the slides or plugs exposed to the fluid flow frequently experience severe erosion. To prevent erosion of costly valve components which would require lengthy downtime for valve replacement, sacrificial wear tabs have been placed on the exposed orifice edges of plugs or slide edges most likely to experience severe erosion. Periodically, these valves are inspected and the wear tabs are replaced. Replacement of the wear tabs is a far simpler, quicker and more economical process than repairing or replacement of frequently large and costly valve components.

DESCRIPTION OF THE PRIOR ART

The concept of the wear tabs for valve components in contact with high temperature gases bearing entrained solids is known in the art. Prior art wear tabs were generally formed having an L-shaped configuration as shown in the section view of FIG. 1. The wear tab T was secured to a valve component C. The valve component C typically was subject to severe erosion due to the combined effects of gas velocity and impact of the entrained solids on the valve component surface.

The prior art wear tabs T had a leading wear surface 1 and a trailing wear surface 2 substantially perpendicular thereto. The leading wear surface 1 initially encountered the fluid flow flowing in the direction of arrow 7 and, by design gradually eroded. Erosion also affected the trailing wear surface 2 in a similar manner. Eventually when enough of the wear tab T had eroded so that the outlines of wear tab T followed the contour illustrated by dashed line 3, process gases with entrained solids, such as catalysts, would be capable of by-passing the valve components C, substantially foreclosing controlled regulation of fluid flow through the valve. Should the corner 4 of the tab T become exposed, expensive valve components would have to be replaced and lengthy production shutdown would ensue.

Since shutdowns in a refining or similar process can be very costly, it is desirable to increase the available on-stream time of high temperature valves.

SUMMARY OF THE INVENTION

The present invention relates to a new and improved edge wear tab for high temperature valve components. The edge wear tab of the present invention has an increased mounting area for enhanced ease in mounting the tab body with the valve and for increased anchoring of refractory or composite material with the valve component. Further, the edge wear tab of the present invention enhances valve component strength by increasing localized compressive forces in such refractory or composite materials in the area adjacent to such tab body.

DETAILED DESCRIPTION OF THE PREFERRED EMBODIMENT

Figure 3:
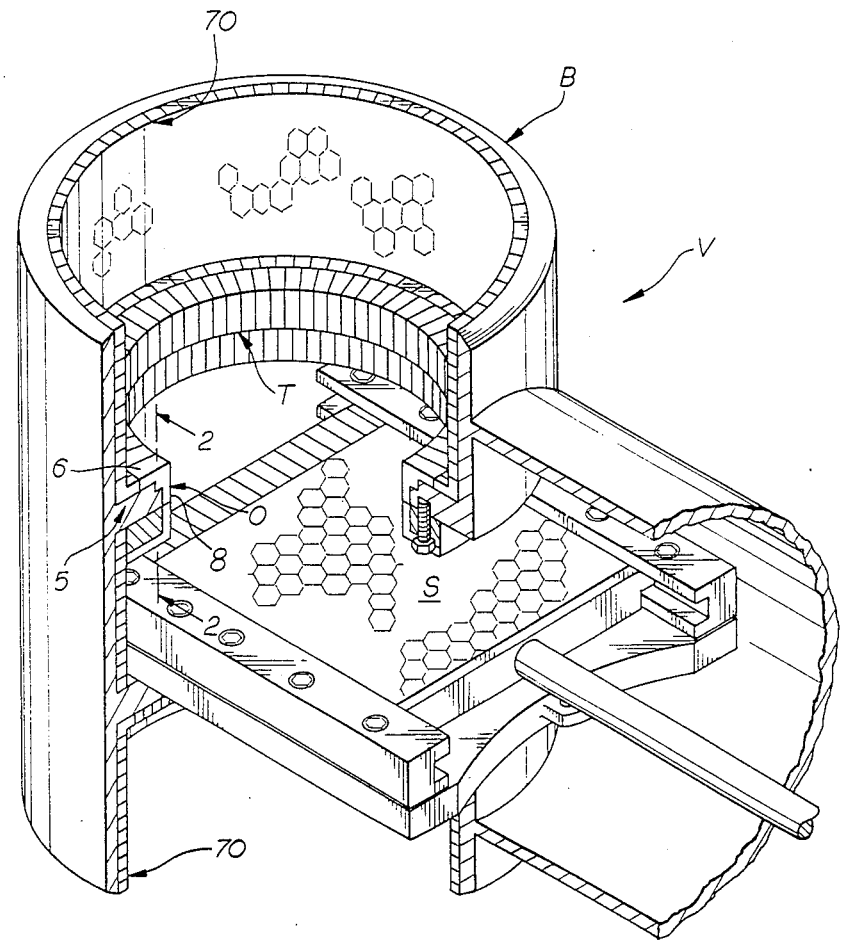
FIG. 3 is a sectional isometric view of a single disk valve incorporating the wear tabs of the present invention.
Figure 4:
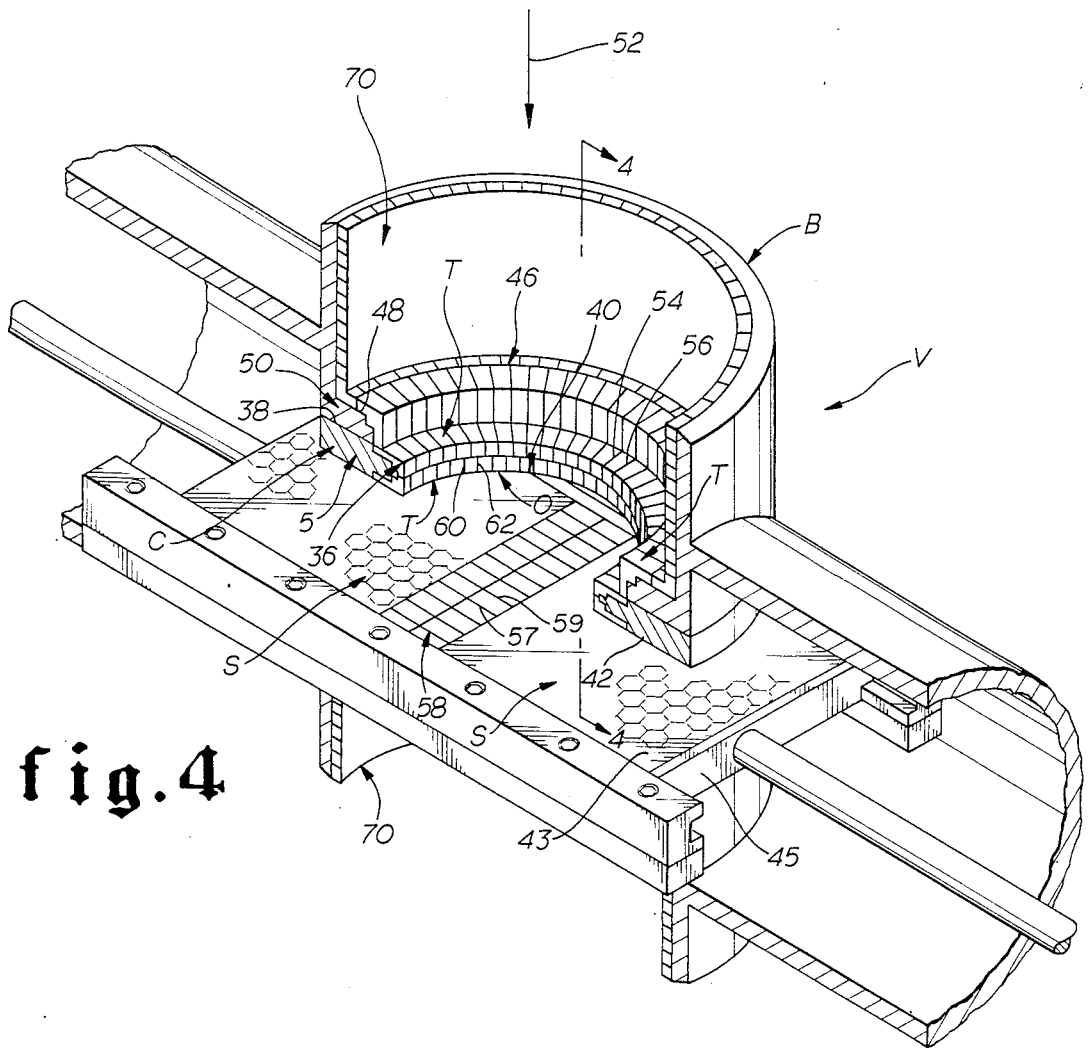
FIG. 4 is a sectional isometric view of a double disk valve incorporating the wear tabs of the present invention; and, FIG. 4A is a sectional, elevational view of the wear tabs of the present invention, taken along the lines 4—4 of FIG. 4.

High temperature valves V used in erosive/corrosive, high temperature environments have several components that are especially vulnerable to rapid deterioration. These components include by way of example and not by way of limitation, a disk 5 (FIGS. 3, 4) which has a central bore thereby defining orifice O and a slide S. The valve construction may incorporate a single slide S as shown in FIG. 3, a plurality of slides S as shown in FIG. 4 or a plug valve of the type known in the art (not illustrated). The valve body B typically is made from a high strength steel or equivalent material. Depending on the temperatures of the fluid flow within valve V, a refractory such as ceramic, by way of example, or a composite material liner 70 of thermally resistive qualities may be placed on the inner surface of valve body B. The edge wear tab T of the present invention is used in combination with such material liner 70 to generally strengthen the edges of orifice O or slide S and to prevent erosion of underlying valve components parts, as discussed more fully hereinbelow.

Figure 2:
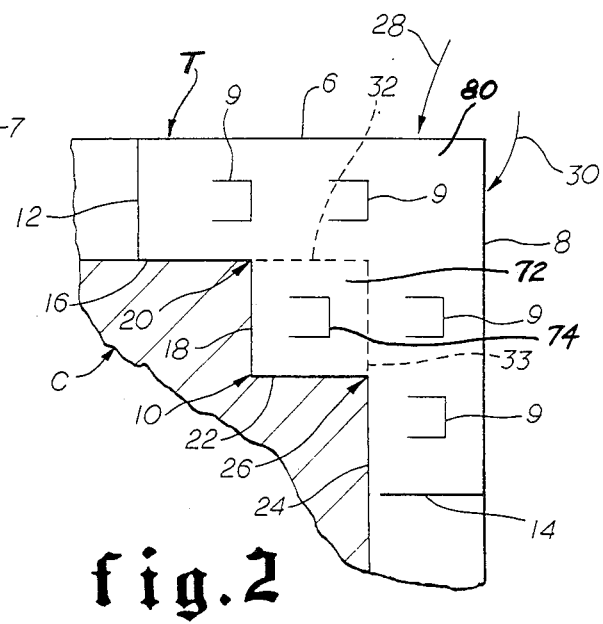
FIG. 2 is a sectional elevational view of the wear tabs of the present invention, taken along the lines 2—2 of FIG. 3.

The edge wear tab T of the present invention (FIG. 2) preferably has a tab body 80 having a leading wear surface 6 which is exposed to the fluid stream. A trailing wear surface 8 is formed with the tab body 80 and substantially perpendicular to the leading wear surface 6. The trailing wear surface 8 may also be exposed to the fluid stream within the valve V. As shown in FIG. 2, the edge wear tab T is mounted to the valve component C along its stepped mounting surface 10 and to the adjacent similarly formed wedge wear tabs T using anchors 9 formed in tab body 80 of a type well known in the art. The stepped mounting surface of the tab body 80 includes a first mounting surface 12 which is preferably formed adjacent to and substantially perpendicular to the leading wear surface 6. A second mounting surface 14 is preferably formed with the tab body 80 adjacent to and substantially perpendicular to the trailing wear surface 8. Adjacent surfaces 16 and 18 form a step 20. Adjacent surfaces 22 and 24 form a second step 26. Surface 16 is preferably formed substantially perpendicular to surface 18 and surface 22 is preferably formed substantially perpendicular to surface 24. Steps 20 and 26 with the tab body 80 complete the edge wear tab T of the present invention by connecting first mounting surface 12 and second mounting surface 14.

As seen by arrows 28 and 30 which depict the impact of the flowing fluid bearing entrained solids on the edge wear tab T, the leading wear surface 6 and trailing wear surface 8 (FIGS. 2, 3) are exposed to the erosive effects of the fluid moving through the valve V.

Figure 1:
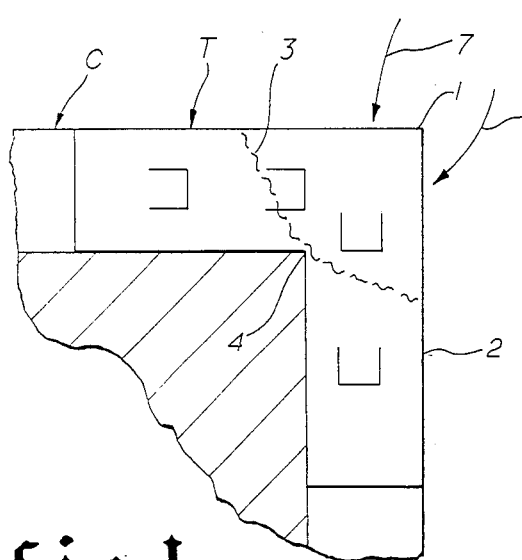
FIG. 1 is a sectional view of a wear tab of a type known in the prior art.

As distinguished from the edge wear tab T of the prior art shown in FIG. 1, the wear tab T of the present invention improves on stream time by providing additional tab material capable of withstanding the erosive effects of the fluid flow before the valve component C is exposed to the fluid flow within the valve V. Referring to FIG. 2, dashed lines 32 and 33 represent the limit of usefulness of wear tabs T known in the prior art. As can readily be seen in the sectional view of FIG. 2, the additional material provided by the wear tab of the present invention as defined by pressure bearing edges or surfaces 18, 22, and dashed lines 32 and 33 allow the wear tab T of the present invention to continue to function well beyond the time when erosion has removed so much of the wear tab T so as to expose the surfaces represented by dashed lines 32 and 33 to the fluid stream in the valve V. The edge wear tab T of the present invention continues to protect the valve component C until edge wear tab T has eroded to the point that valve component C is exposed to the fluid stream. This is first likely to occur where erosion has stripped away surfaces 16, 18, 22 or 24 of the edge wear tab T. However, unprotected portions of the valve component C will not be exposed until well after edge wear tab T has eroded beyond the point represented by dashed lines 32 and 33.

Figure 4A:
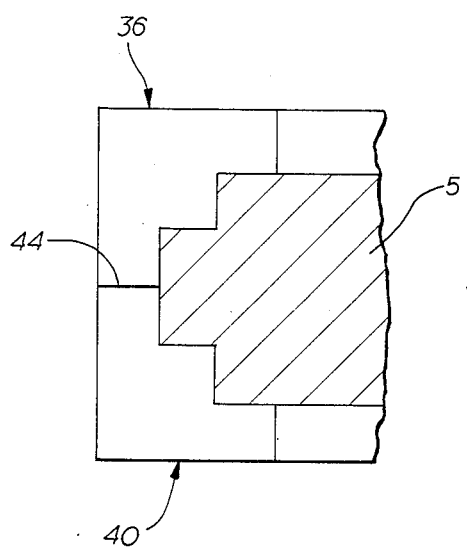

As shown in FIG. 4, a plurality of edge wear tabs T (also numbered 36) can be mounted to the upstream face 38 of a valve component C. Similarly another row of edge wear tabs 40 may be mounted to the downstream face 42 of a valve component C. As shown in FIG. 4, the valve component C, in this case, disk 5, may have a substantially completely enclosed edge due to the contact between edge wear tabs 36 and edge wear tabs 40 along line 44 (FIG. 4A). The leading edge of the slide S may be protected in a similar manner by employing a row of edge wear tabs T on the upstream face 43 and a complementary row of edge wear tabs (not shown) on the downstream face 45, thereby resulting in two contiguous edge wear tabs mounted together along the edge of slide S. Alternatively as shown in FIG. 4, a single row of edge wear tabs 46 may be attached to the upstream face 48 of an orifice disk 50 or any other internal valve component subject to wear. As seen in FIG. 4, the use of a single row of edge wear tabs 46 on the upstream face 48 substantially protects the orifice disk 50 or other equivalent valve component (such as a plug or seat arrangement in a plug valve, not shown) from the erosive effects of the fluid flow through the valve V in the direction represented by arrow 52.

As best seen in FIG. 4, edge wear tabs 36 on the upstream face 38 of valve component C each have edges 54 and 56 disposed in planes in substantial vertical alignment with the direction of the fluid flow in the valve V represented by arrow 52, while edge wear tabs 36 are used to protect the edge of disk 5 which forms orifice O. It can readily be seen that edges 54 and 56 of the wear tabs T may fall in intersecting planes. On the other hand, when edge wear tabs 58 are used to line the leading edge of slide S, edges 57 and 59 may fall in substantially parallel planes.

Edge wear tabs 40 (FIG. 4A) connected to the downstream face 42 (FIG. 4) of valve component C each contain edges 60 and 62 which may be disposed in planes substantially parallel to the direction of fluid flow through valve V as represented by arrow 52. In order to enhance the ability of the combination of edge wear tabs 36 on the upstream face 38 and tabs 40 on the downstream face 42 of a valve component C to resist the erosive effect of the fluid flowing through valve V, edges 54 and 56 of edge wear tabs 36 and edges 60 and 62 of edge wear tabs 40 are preferably vertically misaligned in the direction of gas flow through valve V represented by arrow 52. The misalignment between edges 54 and 56 on one hand and edge 60 and 62 on the other hand, helps to prolong the useful life of the assembly of wear tabs 36 on the upstream face 38 and wear tabs 40 on downstream face 42. Due to the misalignment, the pattern of erosion on edge wear tabs 36 that may start a crevice between individual edge wear tabs 36 on the upstream face 38 will not continue to propagate directly between two individual wear tabs 40 mounted on the downstream face 42.

As best seen in FIG. 2, the edge wear tab T of the present invention results in a tab having an increased tab area 72 defined by surfaces 18, 22, 32, 33. Such increased tab area 72 further includes preferably an additional anchor 74. As a result, the edge wear tab T of the present invention is capable of anchoring itself more permanently in the refractory or composite material 70 than prior art tabs. As a result of such increased tab area 72 with its surfaces 18, 22, a greater edge surface area resists the damaging effects of the pressure drop across the valve V typically encountered by such edge wear tabs T as used on the various valve components C identified hereinabove. Further, the stepped configuration of the edge wear tab T increases the length of time that the wear tab provides cavitation protection within the valve V.

As the edge wear tabs T of the present invention are typically made of steel, the coefficient of expansion of such edge wear tabs T is greater than that of the surrounding liner material 70. As a result, the edge wear tabs T tend to expand at a greater rate than the adjoining liner material 70 in response to heating. This differential in expansibilities of the edge wear tab T and the liner material 70 results in the wear tab T placing the adjoining liner material 70 in compression by action of its anchors 9, 74. As the liner material 70 is of significantly greater strength in compression than in tension, such compressive action enhances the overall ability of the valve component C to resist detrimental wear while the wear tab T enhances the ability to properly hold and secure the liner material 70 to the valve V. In addition, the wear tabs T have additional surfaces, such as 18 and 22 that are available for welding or attaching such wear tabs T in known manner to the valve V.

The foregoing disclosure and description of the invention are illustrative and explanatory thereof, and various changes in the size, shape and materials, as well as in the details of the illustrated construction may be made without departing from the spirit of the invention.

I claim:

1. An edge wear tab for a high temperature valve component, the valve component having an upstream face and a downstream face relative to a fluid flow within the valve, comprising:
   a tab body having a leading wear surface for contacting the fluid flow;
   said tab body having a trailing wear surface substantially perpendicular to said leading wear surface and for contacting the fluid flow;
   said tab body having a stepped mounting surface extending from said leading wear surface to said trailing wear surface and mounted with the valve component, said stepped mounting surface further including:
   a first mounting surface adjacent and substantially perpendicular to said leading wear surface;
   a second mounting surface adjacent and substantially perpendicular to said trailing wear surface; and,
   at least two step segments, each of said step segments including a pair of step surfaces substantially perpendicular to each other and said step segments disposed between said first and second mounting surfaces.

2. The edge wear tab for the high temperature valve component of claim 1 having at least two tap bodies wherein:
   at least one of said tab bodies forms an upstream row mounted to the upstream face of the valve component; and
   at least one of said tab bodies forms a downstream row mounted to the downstream face of the valve component.

3. The edge wear tab for the high temperature valve component of claim 2 wherein:
   said leading wear surface of said upstream row is in contact with said leading wear surface of said downstream row for enclosing an edge of the high pressure valve component.

4. The edge wear tab for a high temperature valve component of claim 3 wherein:
   said upstream row includes a plurality of tab bodies mounted adjacent each other, each of said tab bodies in said upstream row having a first and second edge disposed in at least one first plane, said first plane aligned with the fluid flow through the valve; and
   said downstream row includes a plurality of tab bodies mounted adjacent each other, each of said tabs in said downstream row having a third and a fourth edge disposed in at least one second plane aligned with the fluid flow through the valve and misaligned with said first plane.

5. In a high temperature valve component formed of thermally resistive material, the valve component having an upstream face and a downstream face relative to a fluid flow within the valve, the improvement comprising:
   said high temperature valve component having a stepped mounting surface;
   a tab body having a leading wear surface for contacting the fluid flow;
   said tab body having a trailing wear surface substantially perpendicular to said leading wear surface and for contacting the fluid flow; and,
   said tab body having an intermediate wear portion formed in proximity to the juncture of said leading wear surface and said trailing wear surface, said intermediate wear portion having a stepped mounting surface for engaging the stepped mounting surface of said valve, said mounting surface of said intermediate wear portion transitioning along stair-step surfaces from said leading wear surface to said trailing wear surface.

6. An improved valve component as defined in claim 5 wherein:
   the coefficient of thermal expansion of said tab body is greater than the adjoining thermally resistive material to place such thermally resistive material in compression upon heating of the valve components for extending the useful life thereof.

7. An improved valve component as defined in claim 5, wherein:
   said intermediate wear portion is of a generally rectangular configuration.

8. An improved valve component as defined in claim 5, wherein:
   said intermediate wear portion is formed having at least one set of mutually perpendicular pressure bearing surfaces to enhance the ability of said tab body to resist adverse, destructive pressure drops caused by the fluid flow across said leading and trailing wear surfaces.

* * * * *